United States Patent Office 3,784,502
Patented Jan. 8, 1974

3,784,502
BLOCK COPOLYMER COMPOSITIONS
Ramsis Gobran, Roseville, Leon V. Kremer, Cottage Grove, and Dolores O. Ethier, White Bear Lake, Minn., assignors to Minnesota Mining and Manufacturing Company, St. Paul, Minn.
No Drawing. Application Jan. 27, 1969, Ser. No. 794,354, now Patent No. 3,649,579, which is a continuation-in-part of application Ser. No. 707,976, Feb. 26, 1968. Divided and this application Nov. 10, 1971, Ser. No. 197,506
Int. Cl. C08f 15/00, 3/08, 45/28
U.S. Cl. 260—33.6 PQ                                    6 Claims

ABSTRACT OF THE DISCLOSURE

Adhesives, inks, primers, etc., in which tackifying resins are combined with certain poly alpha-olefin block polymers, have excellent specific adhesion to low energy surfaces such as polyethylene and polypropylene as well as to such other surfaces as metal, wood, plastics, glass and rubber. The polymer is a block alpha-olefin which has the general formula A—(B—A)$_n$ wherein A blocks are at least capable of crystallization and B blocks are substantially amorphous.

FIELD OF THE INVENTION

This application is a division of application Ser. No. 794,354, filed Jan. 27, 1969, now U.S. Pat. No. 3,649,579, which is a continuation-in-part of Ser. No. 707,976, filed Feb. 26, 1968.

This invention relates to poly alpha-olefin block polymers and to improved coating compositions and adhesive tapes made therefrom. More particularly, it relates to tackified hydrocarbon solvent-dispersible elastomeric substantially linear poly alpha-olefin block polymers, having improved adhesion to low energy surfaces together with excellent elongation, tack, cohesive strength, and heat resistance.

Low energy surfaces such as polyethylene and polypropylene have limited use because they are notoriously unreceptive to adhesives, inks, primers, etc. For example, there has long been a need for an adhesive to adhere molded polypropylene machine parts to each other, paper and foil labels to polyethylene and polypropylene bottles, and laminating film to furniture. A truly satisfactory adhesive for such purposes should desirably have, in addition to affinity for both low and high energy surfaces, high tensile and cohesive strength without chemical cross-linking, dispersibility in hydrocarbon solvents, long shelf-life and stability, insensitivity to oxidizing agents, high ultimate elongation, and resistance to softening up to at least 120° F.

A particularly acute commercial need for an adhesive having the foregoing characteristics is in the application of self-supporting protective and decorative laminating films, especially polyethylene or polypropylene. The strength, toughness, and resistance to cooking ingredients make such films ideally suited for utilization as overlays or veneers for furniture, countertops and the like, but heretofore no adequate adhesive has been found. Attempted laminations failed with the film pulling away from the metal, wood, or plastic substrate.

"Hot melt" adhesives, formed by combining tackifiers with polyethylene, polypropylene, or copolymers thereof, are disclosed in U.S. Pats. 2,894,925 and 3,220,966 and British Pats. 915,622 and 1,019,851. A major problem with these adhesives is that they do not adhere unless bonded at elevated temperatures thereby precluding their use on heat-sensitive substrates or applications where it is not economically practical to utilize expensive hot melt equipment. They are also insoluble in the solvents common to the adhesive art.

Many attempts have been made to prepare suitable adhesives, inks, primers, etc., for low energy surfaces that can be applied at room temperature conditions, by compounding low molecular weight soluble ethylene-propylene random copolymers. Similarly, compounding attempts have been made with styrenebutadiene rubbers. Where compatible tackifiers were found, the resultant compositions were gummy, weak, and low in both adhesion and cohesive strength. Such compounding attempts have yielded compositions which are unsatisfactory for most applications.

Block copolymers have been suggested as the main ingredient of general purpose adhesives having relatively high tensile strength and solubility in hydrocarbon solvents. See, e.g., U.S. Pat. 3,239,478, which suggests block copolymers wherein the blocks are either polymers of a vinyl arene or a conjugated diene. Such copolymers, however, have easily oxidized double bonds, making them especially susceptible to oxidation. They also lose their rubber-like properties at temperatures above 50–60° C. and lack adhesion to low energy surfaces. U.S. Pat. 3,378,606 discloses semicrystalline stereoblock poly alpha-olefins having plastic-rubber properties and British Pat. 957,070 discloses crystallizable stereoblock poly alpha-olefin copolymers having rubber-like or elastomeric properties. However, these copolymers with few exceptions are not dispersible in nor suggested to be dispersible in hydrocarbon solvents at room temperature to provide smooth, pourable, stable, homogeneous dispersions.

SUMMARY OF THE INVENTION

This invention provides compositions of adhesives, inks, primers, etc., which have high tensile and cohesive strength without chemical cross-linking, are readily dispersible in hydrocarbon solvents at room temperature, are elastomeric, have little sensitivity to oxidizing agents, and do not soften at temperatures up to at least 120° F. Pressure-sensitive, solvent-dispersed, solvent-activated, and heat-activated adhesives as well as compositions such as printing inks and paint primers can be prepared, permitting adhesion to a wide variety of both low and high energy surfaces, including polyethylene, polypropylene, nylon, polyester, polyformaldehyde, polyvinylidene chloride, polycarbonate, polystyrene, polyvinyl chloride, glass, steel, aluminum, wood, cloth, paper, ceramics, paint, rubber, etc.

Adhesives made in accordance with the invention are thus suited for the preparation of laminated structures having a polypropylene surface. Adherence is so tenacious that it is almost impossible manually to peel apart a laminated panel. Inks made in accordance with the invention are admirably suited for printing on polyethylene or polypropylene films and articles; similarly, primers made in accordance with the invention are well suited for provided excellent adhesion of paints, etc., to both high and low energy surfaces.

Pressure-sensitive adhesive prepared in accordance with the invention are ideally suited for pressure-sensitive tapes having good adhesion to low energy surfaces; in fact, it is usually unnecessary to prime the backing, particularly where the backing is a polyethylene or polypropylene film. Similarly, it is possible to readily prepare pressure-sensitive or heat active transfer films on release linears for use as unsupported adhesive tapes. These adhesives are also ideally suited for use in adhering self-supporting protective and decorative laminating films, particularly polyethylene or polypropylene.

The adhesives, inks, primers, etc., comprise a substantially linear poly alpha-olefin block polymer having the general configuration A(—B—A)$_n$ and an appropriate amount of tackifier. A designates a thermoplastic poly alpha-olefin block that is at least capable of crystallization, has a glass transition temperature above about −60° C. and a crystalline melting point above 100° C. B designates a thermoplastic poly alpha-olefin block that is substantially amorphous, and has a glass transition temperature below about 0° C. The subscript $n$ represents an integer of at least 1. The overall polymer itself exhibits at least one glass transition temperature below about 0° C., at least one above about −60° C., a crystalline melting point above 50° C. and is characterized by ease of dispersibility in such hydrocarbon solvents as heptane, hexane, toluene, xylene and cyclohexane, or blends thereof to provide smooth, pourable, stable, homogeneous dispersions.

These substantially linear block polymers behave like other known crystallizable rubbers, e.g., 1 natural rubber, and the known non-crystalline plastic-rubber block polymers, e.g., styrene-butadiene-styrene copolymers, characteristically having a high ultimate tensile strength so long as the blocks capable of crystallization are adequately large in relation to the total block polymer. This condition is satisfied when the substantially amorphous blocks constitute between about 10 to 90 mole percent of the total block polymer and the blocks capable of crystallization constitute correspondingly between about 90 to 10 mole percent of the total block polymer. The polymers all have a minimum elongation of about 400 percent and a minimum ultimate tensile strength of about 200 pounds per square inch. These block polymers exhibit the property of ease of dispersibility in hydrocarbon solvents at room temperature to provide smooth, pourable, stable homogeneous dispersions if the substantially amorphous blocks are of the above mentioned size. Dispersibility is enhanced when the substantially amorphous blocks preferably constitute between about 25 to 75 mole percent of the total block polymer and the blocks capable of crystallization constitute correspondingly between about 75 to 25 mole percent of the total block polymer. Stable dispersions are those which do not irreversibly coagulate during long term storage.

The overall properties of the polymer are dependent on the type and amount of catalyst used, the particular monomers used in the A and B blocks, and the reaction temperature.

A and B blocks are connected in a regularly alternating sequence, with the terminal positions occupied by A blocks. Although 5 or more blocks are satisfactory, the presently preferred polymers have 3 alternating blocks, primarily because the polymer cost is directly proportional to the number of blocks in the chain. The A blocks which are at least capable of crystallization are those which if annealed, by being heated until almost melted and then slowly cooled, will exhibit crystallinity which is detectable by thermal analysis such as differential thermal analysis or differential scanning colorimetry.

Each A block is in essence a discrete polymer at least capable of crystallization and which is formed from one or more alpha-olefin mnomers selected from the group consisting of propylene and butene-1. A monomer selected for an A block is such that it is capable of being homopolymerized to yield a polymer having a crystalline melting point above about 100° C. and a glass transition temperature above about −60° C.

Each B block is in essence a discrete substantially amorphous polymer formed from one or more alpha-olefin monomers each of which has the general formula $C_nH_{2n}$ wherein $n$ is an integer less than 13. A monomer or mixture of monomers selected for a B block must be such that it is capable of being polymerized in a manner to yield substantially amorphous polymer having a glass transition temperature below about 0° C. Preferred alpha-olefin monomers for polymerization to form the B blocks include: ethylene, propylene, butene-1, pentene-1, hexen-1, heptene-1, octene-1, etc.

The criterion of glass transition temperature, or $T_g$, has been recognized and used for many years to characterize polymers. This temperature, at which large segments of the main polymer chain become mobile, can be determined by "thermodynamic" measurements, such as differential thermal analysis, heat capacity, and dilatometry. Differential thermal analysis (DTA) is preferred because it is rapid, reliable, reproducible, requires only a small sample, and permits determining the crystalline melting point at the same time. Reported or measured glass transition temperatures for homopolymers prepared from monomers preferred for use in the block polymers of this invention are listed in Table III. A copolymer exhibits a glass transition temperature characteristic of the monomers from which it is polymerized. A block polymer usually exhibits a separate glass transition temperature for each block therein unless the $T_g$'s of the individual blocks are so close together that they cannot be readily differentiated by the technique.

A preferred poly alpha-olefin block polymer has 3 connected blocks with the terminal positions occupied by A blocks and the center position occupied by a B block. A designates a thermoplastic block which is a homopolymer of propylene polymerized such that each is capable of crystallization. Each A block has a glass transition temperature above about −60° C. and a crystalline melting point above 100° C. B designates a thermoplastic block which is a copolymer of ethylene and propylene polymerized such that it is substantially amorphous and has a glass transition temperature below about 0° C. The propylene A blocks constitute between about 25 to 75 mole percent of the total block polymer and the ethylene-propylene copolymer B block constitutes correspondingly between about 75 to 25 mole percent of the total block polymer. The overall block polymer itself exhibits at least one glass transition temperature below about 0° C., at least one above about −60° C., a crystalline melting point above about 50° C. and is characterized by dispersibility in such hydrocarbon solvents as heptane, hexane, toluene, xylene, and cyclohexane, or blends thereof to provide a stable, pourable, homogeneous dispersion.

PREPARATION OF POLYMER

Preparation of the poly alpha-olefin block polymers used in the invention typically employs a Ziegler-Natta type catalyst, prepared either separately or in situ. Suitable catalysts include vanadium oxytrichloride, with aluminum alkyls or halo alkyls as co-catalysts. In general, the preferred catalyst system consists of a transition metal in a high oxidation state and a reducing agent which is typically an aluminum alkyl. The catalyst is most active and gives the fastest reaction rate and highest yield per gram of catalyst when the catalyst and co-catalyst are mixed in situ in the presence of the monomer.

In general, the appropriate monomer is first introduced into a pressure reaction vessel in the presence of the selected catalyst together with a solvent such as hexane, chlorobenzene, heptane, or toluene. The first A block is polymerized to the desired molecular weight as measured by inherent viscosity; the chain length attained, being a direct function of the quantity of monomer introduced into the reaction vessel. The monomer or monomers from which the B block is polymerized is then introduced directly into the reaction vessel, and polymerized onto the end of the A block; the chain length attained again being a direct function of the quantity of monomer introduced. At completion of the polymerization of the B block, the monomer for the next A block is introduced and polymerized on the free end of the B block. This procedure is repeated until the desired number of blocks is attained. It is possible to prevent copolymerization of one block with another from occurring by removing unreacted monomer before proceeding with polymerization of the next block. Alternatively, monomers for any block can be introduced before the previous block has complete polymerization, thereby reducing sharpness of the intersection between the two blocks.

The progress of the polymerization can readily be determined by measuring the inherent viscosity of samples withdrawn at intervals from the polymerization reaction. Viscosity of the samples will show a steady increase, corresponding to progress of the polymerization. To obtain the combination of polymer properties needed for preparing adhesives, inks, primers, etc., inherent viscosity (as determined in tetralin at 135° C.) after polymerization of the first A block should be at least about 0.5 dl./gm. at 0.1% weight per volume. After the polymerization of the first B block, inherent viscosity should be at least 1, and the inherent viscosity of the final polymer, regardless of the number of blocks it contains, should be at least about 1.2. The maximum inherent viscosity obtained is never more than about 7. Typical inherent viscosities are shown in Table IV.

Increasing the chain length of a B block relative to the A blocks increases ultimate elongation of the polymer. Tacticity of any given block is inversely related to reaction temperature during its formation. Since the percentage of a polymer capable of crystallizing is a function of the polymerization temperature it is possible to advantageously program polymerization temperatures to provide crystalline and amorphous sequences in a block.

Thus, this principle permits formation of poly alpha-olefin block polymers from a single monomer wherein the block polymer has alternating amorphous blocks and blocks capable of crystallization. An A block at least capable of crystallization is first polymerized near the maximum temperature utilizable, the temperature raised at least 25° C., a substantially amorphous B block polymerized, and then the reactor is returned to substantially the original temperature and another A block polymerized. This sequence can be repeated to obtain the desired number of blocks.

Polymers prepared in accordance with this invention are readily dispersible at room temperature in hydrocarbon solvents such as hexane, heptane, etc., by use of a laboratory roller mill or mixer to provide stable, pourable, homogeneous dispersions.

PREPARATION OF ADHESIVES, INKS, AND PRIMERS

A particular advantage of these high tensile strength block polymers is their compatibility with tackifying resins, permitting formulation of a wide variety of compositions. For example, a preferred pressure-sensitive adhesive can be formulated from a block polymer relatively low in tensile strength (e.g., 200 p.s.i. to 1000 p.s.i.), and a suitable tackifying resin such as a polyterpene, stabilized ester resin, or hydrogenated rosin. A preferred general purpose solvent-dispersed adhesive can be formulated from a block polymer of intermediate tensile strength (e.g., 500 p.s.i. to 1500 p.s.i.). A preferred heat-bonding adhesive can be formulated from a block polymer of intermediate to high tensile strength (e.g., 1000 p.s.i. to 5000 p.s.i.). The choice of tackifying resin is determined by degree of tack needed, softening point desired, color, and compatibility with such other components as extender oils, stabilizers, plasticizers, pigments, etc. A compatible solution of the polymer and tackifier in appropriate solvent does not irreversibly separate into phases or settle when allowed to stand for extended periods of time. The amount of tackifying resin needed varies with the particular polymer and end use. It can range from about 5 parts by weight per 100 parts of polymer to about 300 parts by weight of resin per 100 parts of polymer. In general, a preferred composition will contain the following parts by weight of tackifying resin per 100 parts of block polymer: pressure-sensitive adhesive, about 75 to 300; a general purpose solvent-dispersed or solvent activated adhesive, about 50 to about 200; a heat-activated adhesive, about 5 to about 150; primer, about 25 to about 200.

Suitable tackifying resins include polyterpenes, stabilized polyterpenes, terpene-phenolics, hydrogenated rosin, esters of hydrogenated rosin, esterified wood rosin, stabilized ester resin, styrene copolymers, hydrocarbon resins, and chlorinated hydrocarbon resins.

The following examples, in which all parts are by weight unless otherwise noted, illustrate preparation of the polymers, adhesives, inks, and primers of this invention, without limiting the scope thereof.

DESCRIPTION OF PREFERRED EMBODIMENTS

Example 1

This example illustrates the general method by which the polymers are prepared, particularly a 3-block polymer having low tensile strength, polypropylene end blocks and an ethylene:propylene copolymer center block.

A 1500-ml. pressure vessel fitted with a mechanical stirrer was evacuated, filled with dry pure nitrogen and re-evacuated. While stirring vigorously, 175 ml. of heptane, 1 gram of diethyl aluminum chloride in 20 ml. heptane, 40 percent of the monomer for the first A block (0.08 mole of propylene), 0.5 gm. (0.00347 mole) of vanadium oxytrichloride in 50 ml. of heptane, 200 ml. of dry heptane and the remainder of the monomer for the first block (0.12 mole propylene), were introduced in order.

Temperature of the reaction mixture was maintained at 10–17° C. by circulating water around the reaction vessel. The first A block was polymerized for about 60 minutes, at the end of which time substantially all propylene had reacted, as was evidenced by no further pressure-drop in the vessel. The reaction mixture was then heated to 30° C. and 0.125 mole each of ethylene and propylene introduced to form a B copolymer block. After 60 minutes at 30–32° C., the reaction vessel was cooled to about 18° C., monomer for the third block (0.2 mole of propylene) introduced and polymerized for about 150 minutes. Nitrogen was then introduced and the polymer suspension poured into an acidified methanol solution. The polymer was washed several times with methanol and dried.

Dried polymer was formed into a flat self-supporting sheet by means of a laboratory press and physical properties were determined. Tensile strength was 456 p.s.i., elongation was 1.030 percent, and glass transitions occurred at −54° C. and −20° C. as determined by differential thermoanalysis. The final inherent viscosity of the polymer (as determined in tetralin at 135° C.) was 1.73. The polymer was 32% soluble in diethyl ether maintained at its boiling point for 10 minutes, 90% soluble in n-heptane maintained at its boiling point for one hour, and 100% dispersible in n-hexane at room temperature to provide a smooth, stable, pourable, homogeneous dispersion. This polymer provides excellent pressure-sensitive adhesives, printing inks, and paint primers, when compounded with tackifying resin.

Example 2

This example illustrates preparation of a block polymer wherein each individual block is prepared from the same monomer. The general method of preparation is the same as in preceding Example 1 except that tacticity of the alternating blocks is varied by changing the polymerization temperature. Propylene (1.0 mole) was introduced into the reaction vessel along with 5 grams of aluminum diethyl chloride, 2.5 grams of vanadium oxychloride, and 1200 ml. of dry pure heptane. The reaction proceeded for two hours at a temperature of 19–21° C. to form an end A block. The adjacent B block was polymerized by introducing more propylene (2.0 moles), raising the temperature to 54–57° C., and maintaining it for two hours. A second A block was then polymerized in place on the end of the B block by introducing more propylene (1.0 mole), lowering the temperature to 18° C., and allowing the reaction to proceed for 6 hours. The polymer was then worked up, dried, and pressed as illustrated in Example 1. Physical properties of the resulting block polymer are illustrated in Table 1. When dissolved as in Example 1, this polymer was found to be 43% soluble in ether, 87% soluble in n-heptane, and 100% dispersible in n-hexane at room temperature. Propylene polymerized under these same conditions, but at a constant temperature (19–21° C. used to form block A) was found to be only 37% soluble in boiling n-heptane. This polymer provides excellent general purpose adhesives and primers when compounded with tackifying resin.

Example 3

This example illustrates preparation of a block polymer containing 5 blocks. The polymerization procedure, catalyst, and equipment of Example 1 was used. The first block (A) was formed from 0.15 mole of propylene, with the reaction proceeding at a temperature of 16–20° C. for one hour and the reactor evacuated. The second block (B) was a copolymer of ethylene and propylene (0.125 mole each), with the polymerization of this block proceeding at 32–35° C. for 47 minutes. The third block (A) was formed from 0.15 mole of propylene and was polymerized for 85 minutes at 12–16° C. The fourth block (B) was polymerized from a mixture of ethylene and propylene (0.125 mole each) which were reacted for 57 minutes at 30–37° C. The final block (A) was formed from 0.15 mole of propylene, which was polymerized at 18° C. for 109 minutes. Properties of the final 5-block polymer are illustrated in Table 1. This polymer provides excellent general purpose adhesives, pressure-sensitive adhesives and primers when compounded with tackifying resin.

Example 4

This example illustrates preparation of a block polymer having high tensile strength which is useful for compounding heat bondable adhesives. The general polymerization procedure of Example 1 was followed, except that the reactor was evacuated before charging the monomer for the second block.

A 37.8-liter pressure reactor was charged with 12 kg. of heptane, 40 gms. of diethyl aluminum chloride, and 20 gms. of vanadium oxytrichloride. Sixteen moles of propylene were introduced and the first block A polymerized until an inherent viscosity of 2.4 was reached. The reactor was evacuated and 5 moles each of ethylene and propylene introduced and polymerized until an inherent viscosity of 4.2 was reached. The reactor was evacuated and 16 moles of propylene introduced and polymerized until an inherent viscosity of 4.5 was reached. Physical properties of the resulting block polymer are illustrated in Table 1.

TABLE I

| Ex. | The example illustrates— | A block Monomer | A block Moles | B block Monomer | B block Moles | A block Monomer | A block Moles | Tensile strength | Percent ultimate elongation | Tg, °C. | Tm, °C. | Particular utility | Final inherent viscosity |
|---|---|---|---|---|---|---|---|---|---|---|---|---|---|
| 1 | Low tensile strength, propylene A blocks, ethylene-propylene B block | Propylene | 0.2 | Ethylene / Propylene | 0.125 / 0.125 | Propylene | 0.2 | 456 | 1,030 | −54, −20 | 150 | Pressure-sensitive adhesive, primer, ink | 1.73 |
| 2 | All blocks of the same monomer | do | 1.0 | Propylene | 2.0 | do | 1.0 | 1,600 | 960 | −11 | 163 | General purpose adhesive, heat bondable adhesive, primer | 2.66 |
| 3 | 5 block polymer | do | 0.15 | Ethylene / Propylene | 0.125 / 0.125 | do A-3 0.15 | 0.15 | 713 | 1,050 | −24, −54 | 156 | Pressure-sensitive adhesive, general purpose adhesive, primer | 2.11 |
| 4 | High tensile strength | do | 16 | Ethylene / Propylene B-2 5/5 | | do | 16 | 2,060 | 860 | −16, −56 | 151 | Heat bondable adhesive | 4.5 |
| 5 | Medium tensile strength | do | 0.2 | Ethylene / Propylene | 0.20 / 0.10 | do | 0.2 | 1,020 | 850 | −51, −18 | 150 | General purpose adhesive, heat bondable adhesive, primer, ink | 2.75 |
| 6 | do | do | 1.6 | Ethylene / Propylene | 1.0 / 1.0 | do | 1.6 | 1,200 | 1,000 | −58, −20 | 151 | do | 3.48 |
| 7 | Butene-1, B block | do | 0.4 | Butene-1 | 1.0 | do | 0.4 | | | −22 | | do | 3.75 |
| 8 | Hexene-1, B block | do | 0.75 | Hexene | 3.0 | do | 0.75 | | | −48, −20 | | do | 1.17 |
| 9 | Ethylene-hexene-1, B block | do | 0.75 | Ethylene / Hexene-1 | 0.5 / 2.0 | do | 0.75 | | | −56 | | do | |
| 10 | Propylene-butene-1, B block | do | 0.75 | Propylene / Butene-1 | 1.0 / 0.6 | do | 0.75 | | | −40 | | do | |
| 11 | Ethylene-butene-1, B block | do | 0.5 | Ethylene / Butene-1 | 0.2 / 1.25 | do | 0.5 | | | −62, −20 | | General purpose adhesive, heat bondable adhesive | 1.91 |
| 12 | Propylene-butene-1, B block | do | 1.0 | Propylene / Butene-1 | 1.0 / 1.0 | do | 1.0 | 985 | 930 | −14 | | Pressure-sensitive adhesive, general purpose adhesive | 2.09 |
| 13 | Propylene-octene-1, B block | do | 0.75 | Octene-1 / Propylene | 0.75 / 3.0 | do | 0.75 | | | | | General purpose adhesive | |

Examples 5–13

Each of these examples was prepared in the general manner of Example 1, using the monomers and amounts of monomer shown in Table 1. In all instances the reactor was evacuated after polymerization of the first block before monomer for the second block was introduced, as indicated in the last column of Table 1. The composition and physical properties of the resulting block polymers are illustrated in Table 1.

Example 14

This example illustrates preparation of a pressure-sensitive adhesive. One hundred parts of block polymer prepared in accordance with Example 6 was dispersed in 650 parts of hexane and 125 parts of polyterpene resin ("Hercules, S–1010" commercially available from Hercules, Incorporated) was added. This dispersion was coated on primed 1 mil polyester film and dried at room temperature to form a pressure-sensitive adhesive tape. The resulting dry coating weight was 9¾ grains per 24 square inches. Tack and adhesion of this tape were compared to a tape formed by coating a commercially available pressure-sensitive adhesive (National Starch Resyn 33–1431) on the same backing, and dried in the same manner. The pressure-sensitive adhesive tape of this example was also compared with commercially available transparent pressure-sensitive tapes, one having rubber-resin adhesive and the other having an acrylate adhesive. Samples of these four tapes were applied to a rigid untreated polypropylene sheet by means of a roll laminator at room temperature. The specimens were allowed to age at room temperature for 24 hours, and tested for peel strength. The polypropylene sheet was clamped in an "Instron" tensile machine and the tape peeled back on itself at an angle of 180° at a test speed of 12 inches per minute (ASTM D–903). The pressure-sensitive adhesive showed a peel strength of 9–10 lbs. per inch of width, while the other three pressure-sensitive adhesives and tapes gave a maximum of only 2.6 lbs. per inch.

Example 15

This example illustrates preparation of a general purpose solvent dispersed adhesive. One hundred parts of the polymer of Example 6 was mixed with 800 parts of hexane, 100 parts of polyterpene resin tackifier (e.g., "Hercules," S–1010, commercially available from Hercules, Incorporated) and dispersed by means of a mixer. This adhesive composition was tested by brushing two coats (with a 30-minute open time between all coats) on various substrates and three coats on 1-inch wide canvas strips. Thirty minutes after application of the last coat, the adhesive surfaces were placed in contact and the resulting laminate rolled with a 2-lb. metal hand roller to complete the bond. The completed bonds were allowed to dry at room temperature for one day and at 120° F. for two days. Each bond was then tested on a Scott tensile tester by peeling the canvas strip back on itself at an angle of 180° at a rate of 2 inches per minute. The results of each of these tests are shown in Table II below. One of the best commercially available prior art general purpose solved dispersed adhesives ("Piobond-30," a nitrile-phenolic adhesive, commercially available from Goodyear Tire and Rubber Company) was tested in the same manner. These results are also tabulated in Table II.

Example 16

This example was prepared and tested in the same manner as Example 15 except that 150 parts of tackifying resin was used with 100 parts of polymer. The results are indicated in Table II.

Example 17

This example was prepared and tested in the same manner as Example 15 except that 175 parts of tackifying resin was used with 100 parts of polymer. The results are indicated in Table II.

TABLE II

| | Pounds peel/1" width | | | |
| --- | --- | --- | --- | --- |
| | | Example | | |
| Substrate | Plio-bond-30 | 15 | 16 | 17 |
| Polypropylene | 1 | 12.9 | 24.3 | 23.8 |
| Linear polyethylene | 0.5 | 5.6 | 3.5 | 2.3 |
| Steel | 10 | 15.1 | 35.2 | 35.3 |
| Polyacetal | | 12.8 | 18.0 | 23.1 |
| Supported PVC (plasticized) | 12 | 12.8 | 12.4 | 13.2 |
| Glass | 12 | 17.0 | 29.5 | 30.6 |

Example 18

This example illustrates preparation of a decorative and protective laminating film utilizing a heat-bonding adhesive. One hundred parts of block polymer prepared in accordance with Example 6 was dispersed in 800 parts of hexane and 100 parts of polyterpene resin ("Hercules" S–1010, commercially available from Hercules, Incorporated) was added. This dispersion was then coated on 3 mil polypropylene film, which had previously been printed with a decorative pattern, and dried at a temperature of 150° F. for 20 minutes to form a heat-bondable laminating film.

This laminating film and a standard heat-activated vinyl veneer laminating film, were adhered to a rigid polyethylene sheet by means of a heat laminator at 185° F. The bonds were tested for peel strength as described in Example 15. With the adhesive of this example, the polypropylene film backing broke at about 7 lbs./in. while the prior art adhesive failed at 0–0.25 lb./in.

Example 19

The process of Example 18 was repeated with the polymer of Example 1 and 100 parts of hydrogenated rosin ("Staybelite" resin commercially available from Hercules, Incorporated) to formulate a pressure-sensitive adhesive. This was coated and dried on the same polypropylene film in Example 19. The adhesive was very tacky to the touch.

This laminating film and a standard commercially available vinyl laminating film (acrylate adhesive) were each adhered to a rigid polyethylene sheet by means of a roll laminator at room temperature. The bonds were tested for peel strength as in Example 15. Peel adhesion was 5.5 lbs./in. with the adhesive of this example, while the prior art adhesive gave only 0.1–1.2 lbs./in.

Example 20

This example illustrates preparation of pressure-sensitive and heat-bondable transfer films for use as self-supporting adhesive tapes. The adhesives of Examples 19 and 18 were individually coated on release liners, dried for 20 minutes at 150° F., cooled, and wound into roll form. Each of these films readily releases from the liner to give a self-supporting adhesive film for adhering two surfaces to each other by pressure or heat and pressure.

TABLE III
Reported glass transition temperature

| | Degrees centigrade |
| --- | --- |
| Polyethylene | −120 to −20. |
| Polypropylene | −18 to 0. |
| Polybutene-1 | About −25. |
| Polypentene | −40 to 37. |
| Polyhexene | −55 to −50. |
| Polyoctene-1 | About −65. |
| Polydodecene-1 | About −36. |

TABLE IV.—INHERENT VISCOSITIES

| | A | AB | ABA |
| --- | --- | --- | --- |
| Example: | | | |
| 2 | 1.58 | 1.96 | 2.66 |
| 5 | 1.56 | 2.33 | 2.75 |
| 6 | 2.32 | 3.35 | 3.48 |
| 12 | 1.19 | 1.60 | 2.09 |

Examples 21-22

These examples illustrate preparation of primers suitable for use in adhering synthetic paint finishes to both high and low energy surfaces. The primer formulations of Table V were individually prepared by placing all af the components in gallon containers and mixing them for about 24 hours on a laboratory roller mill. The primers were then further dispersed for about 10 minutes by means of a high speed laboratory propeller mixer, smooth homogenous mixtures being obtained.

The primers were each brushed onto 1/8" thick polypropylene test panels and dried at 160° F. for 15 minutes. A coating of automotive interior paint (Lucite Acrylic Lacquer No. 956-99350, E. I. Du Pont & Co.) was then sprayed over the primers and allowed to dry for 24 hours at room temperature. Each panel was then subjected to the standard cross-hatch test by (1) making a series of parallel and perpendicular razor blade cuts about 1/8" apart in the paint and primer, (2) applying a strip of Scotch brand cellophane tape over the cuts, (3) rubbing the tape surface with a pencil eraser, and (4) quickly removing the tape at approximately a 90° angle.

Adhesion of the paint to the primer and of the primer to the polypropylene was excellent. The tape removed only very small amounts of paint or primer and then only from the cuts themselves. Primed and painted test panels which had been immersed in 23° C. water for 100 hours were tested in the above manner, the primer providing excellent adhesion of the paint to the polypropylene. Control test panels, some utilizing standard automotive primer and others without any primer, were subjected to the cross-hatch test with almost all of the paint being removed by the tape in each case.

The primer formulations of this example were evaluated on metal test panels in the manner previously described and were found to provide excellent anchorage of the paint to the test panel. There was very little removal of paint or primer by the cross-hatch tape test.

TABLE V

| Example | 21 | 22 |
| --- | --- | --- |
| Polymer from Example 6 | 150 | 200 |
| Polyterpene resin [1] | 300 | 200 |
| Chlorinated polyolefin resin [2] | 90 | 80 |
| $Fe_2O_3$ [3] | 30 | 30 |
| Toluene | 2,700 | 2,430 |

[1] S-1010, Hercules, Incorporated.
[2] Eastman 343-1 (50% solids in xylene), Eastman Chemical Products, Co.
[3] Reagent grade, J. T. Baker Chemical Company.

Example 23

This example illustrates preparation of an ink suitable for silk-screening, stenciling, etc.

One hundred grams of the polymer of Example 6 was combined in a 3.78 liter container with 200 gms. of polyterpene resin (S-1010, Hercules, Incorporated), 400 gms. of hexane, 400 gms. of toluene, and 137.5 gms. of predispersed carbon black (RBH-3046, Interchemical Corporation). The mixture was stirred with a laboratory propeller mixer until a smooth homogeneous dispersion was obtained. The ink was coated on a polypropylene substrate, dried, and subjected to the cross-hatch test described in Examples 21-22. Essentially no ink was removed by the tape.

What is claimed is:

1. In a process for preparing elastomeric substantially linear polypropylene block polymers of the general formula $A-(B-A)_n$ wherein $n$ is an integer of at least 1, which comprises polymerizing first one block and then the next block alternately, the polymerization of each block being continued to a predetermined inherent viscosity depending on the length of the required block, said polymerization being effected in the presence of a catalyst system consisting of a transition metal in high oxidation state and a reducing agent, the improvement comprising:

(a) polymerizing the propylene to form the first A block at a temperature below about 35° C. such that it is at least capable of crystallization and has an inherent viscosity greater than 0.5 dl./gm. as measured at 0.1% weight per volume in tetralin at 135° C., glass transition temperature above about −60° C. and crystalline melting point above 100° C., and (b) polymerizing the propylene to form the first B block onto one end of the A block at a temperature about 25° C. higher than the polymerization temperature of the said A block such that (1) it is substantially amorphous, (2) the resultant AB polymer has an inherent viscosity greater than about 1.0 as measured at 0.1% weight per volume in tetralin at 135° C., and (c) polymerizing the propylene to form the second A block onto the free end of the B block in the same manner as in (a) such that it is at least capable of crystallization and such that the resulting ABA polymer has an inherent viscosity greater than about 1.2 as measured in tetralin at 135° C., and (d) polymerizing the propylene to form each succeeding A block in the same manner as in (c) and each succeeding B block in the same manner as in (b), whereby said $A-(B-A)_n$ block polymer has high tensile and cohesive strength combined with dispersibility at room temperature in hydrocarbon solvents.

2. A process according to claim 1 for preparing an elastomeric substantially linear poly alpha-olefin block polymer of the general configuration $A-(B-A)_n$ wherein $n$ is an integer of at least 1, wherein step (a) comprises polymerizing all of the A blocks at a temperature between about 10 to 35° C. and step (b) comprises polymerizing all of the B blocks at a temperature at least 25° C. above that used to polymerize the A blocks, and the catalyst system employed is vanadium oxychloride with aluminum alkyl or haloalkyl.

3. An elastomeric linear block polymer of the general formula $A-B-A$, said polymer having a tensile strength of about 200 to 5000 pounds per square inch, an elongation of about 400 to 1500 percent, an inherent viscosity of about 1.2 to 7.0 as determined in tetralin at 135° C., at least one glass transition temperature below about 0° C., a crystalline melting point above 100° C. as determined by differential thermal analysis, being dispersible in hydrocarbon solvents at room temperature to form stable, homogeneous dispersions, consisting essentially of three poly-olefin blocks and being especially suited for use in solvent-dispersible adhesives, primers, and inks having elastomeric properties and specific adhesion for polyethylene and polypropylene and other such adherends as metals, wherein:

the first A block is at least capable of crystallization, having an inherent viscosity greater than about 0.5 as measured in tetralin at 135° C., a glass transition temperature above about −60° C. as determined by differential thermal analysis, a crystalline melting point above 100° C., and consists essentially of a homopolymer of propylene, and the B block attached to one end of the first A block consists essentially of a substantially amorphous copolymer of ethylene and propylene polymerized such that combined blocks A and B have an inherent viscosity greater than about 1, and the final block polymer has a glass transition temperature below 0° C. attributable to said B block, and the next A block attached to the B block consists essentially of a homopolymer of propylene polymerized such that it is at least capable of crystallization and that the total block polymer has an inherent viscosity greater than 1.2 as measured in tetralin at 135° C., and the propylene A blocks constitute between about 25 to 75 mole percent of the total block polymer and the ethylene-propylene copolymer B block constitutes correspondingly between about 75 to 25 mole percent of the total block polymer.

4. An elastomeric linear block polymer of the general formula A—B—A dispersible in hydrocarbon solvents at room temperature to form stable, homogeneous dispersions and especially suited for use in solvent-dispersible adhesives, primers, and inks having elastomeric properties and specific adhesion for polyethylene and polypropylene and such other adherends as metals, said polymer having tensile strength of about 20 0to about 5000 pounds per square inch, an elongation of about 400 to about 1500%, an inherent viscosity of about 1.2 to 7.0 dl./gm. as determined in tetralin at 135° C., at least one glass transition temperature below about 0° C., a crystalline melting point above about 100° C. as determined by differential thermal analysis, wherein:

the first A block is a homopolymer of propylene which is at least capable of crystallization and has an inherent viscosity greater than about 0.5 dl./gm. as measured in tetralin at 135° C., a glass transition above about −60° C. as determined by differential thermal analysis and a crystalline melting point above 100° C., and the B block is substantially amorphous homopolymer of propylene, and the next A block attached to the B block is a homopolymer of propylene which is at least capable of crystallization.

5. A stable, homogeneous dispersion of a polymer according to claim 3 in a hydrocarbon solvent.

6. A dispersion according to claim 5, wherein the solvent is n-hexane.

References Cited
UNITED STATES PATENTS

| | | | |
|---|---|---|---|
| 3,378,606 | 4/1968 | Kontos | 260—878 B |
| 3,175,999 | 3/1965 | Natta et al. | 260—878 B |
| 3,534,965 | 10/1970 | Harrison et al. | 260—878 B |
| 3,649,579 | 3/1972 | Gobran et al. | 260—878 B |

JOSEPH L. SCHOFER, Primary Examiner

A. HOLLER, Assistant Examiner

U.S. Cl. X.R.

260—93.7, 878 B

UNITED STATES PATENT OFFICE
CERTIFICATE OF CORRECTION

Patent No. 3,784,502    Dated January 8, 1974

Inventor(s) Ramsis Gobran, Leon V. Kremer, Dolores O. Ethier

It is certified that error appears in the above-identified patent and that said Letters Patent are hereby corrected as shown below:

Column 10, line 62, "-120" should read -- -125 -- .

Column 10, line 65, "37" should read -- -37 -- .

Signed and sealed this 10th day of September 1974.

(SEAL)
Attest:

McCOY M. GIBSON, JR.
Attesting Officer

C. MARSHALL DANN
Commissioner of Patents